United States Patent [19]

Sanders

[11] Patent Number: 5,688,545
[45] Date of Patent: Nov. 18, 1997

[54] COFFEE PACKAGE WITH ENHANCED AROMA IMPACT

[75] Inventor: Neil Sanders, Banbury, United Kingdom

[73] Assignee: Kraft Jacobs Suchard Limited, Cheltenham, United Kingdom

[21] Appl. No.: 610,771

[22] Filed: Mar. 4, 1996

[51] Int. Cl.[6] .................................................. B65D 85/00
[52] U.S. Cl. ........................... 426/120; 426/112; 426/124; 426/316; 426/398; 426/594; 426/595; 426/122; 426/106
[58] Field of Search ........................ 426/112, 124, 426/120, 131, 106, 316, 312, 392, 398, 394; 206/205

[56] References Cited

U.S. PATENT DOCUMENTS

| | | | |
|---|---|---|---|
| 2,357,258 | 8/1944 | Harris | 426/316 |
| 2,705,579 | 5/1955 | Mason | 426/120 |
| 2,719,660 | 10/1955 | Ellis | 426/124 |
| 3,323,640 | 6/1967 | Kugler | 426/112 |
| 3,346,398 | 10/1967 | Tundermann et al. | 426/124 |
| 3,367,785 | 2/1968 | Finucane | 426/112 |
| 3,603,454 | 9/1971 | Raaf | 206/205 |
| 3,769,032 | 10/1973 | Lubsen . | |
| 3,939,971 | 2/1976 | Tulis | 426/124 |
| 3,942,634 | 3/1976 | Gandi et al. | 206/205 |
| 4,034,116 | 7/1977 | Hamell et al. | 426/106 |
| 4,172,903 | 10/1979 | Daswick | 426/395 |
| 4,478,858 | 10/1984 | Baird et al. | 426/126 |
| 4,550,026 | 10/1985 | Andd | 426/124 |

FOREIGN PATENT DOCUMENTS

| | | | |
|---|---|---|---|
| 1460 | 4/1979 | European Pat. Off. | 426/124 |
| 2411310 | 9/1975 | Germany | 426/398 |
| 3026367 | 10/1981 | Germany | 426/324 |
| 6-98736 | 4/1994 | Japan | 426/106 |
| 1206047 | 9/1970 | United Kingdom | 426/106 |

OTHER PUBLICATIONS

"Sustrelle" Brochure Jun. 1975.

*Primary Examiner*—Steven Weinstein
*Attorney, Agent, or Firm*—Thomas A. Marcoux; Thomas R. Savoie

[57] ABSTRACT

A coffee pack and method of packaging a coffee product. The coffee pack comprises a shell that forms separate coffee and aroma compartments with a small communicating hole or channel between the compartments. A quantity of a particulate coffee product, preferably soluble coffee, is located in the coffee compartment, and a quantity of a coffee aroma liquid containing aromatic volatiles, preferably coffee oil, is disposed in the aroma compartment. The communicating hole or channel between the compartments allows the aromatic volatiles to pass from the aroma compartment to the coffee compartment, without allowing any mixing, or at least any substantial mixing, in the coffee compartment between the coffee product and the coffee aroma liquid.

8 Claims, 4 Drawing Sheets

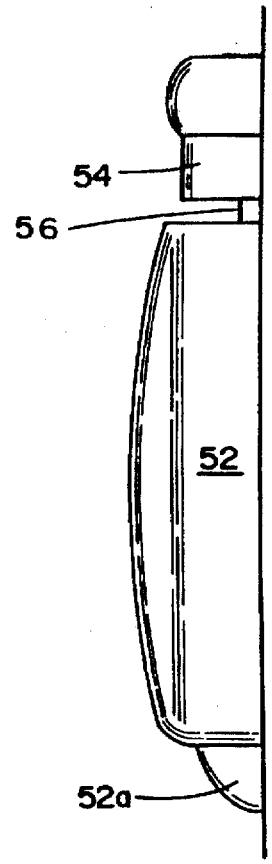
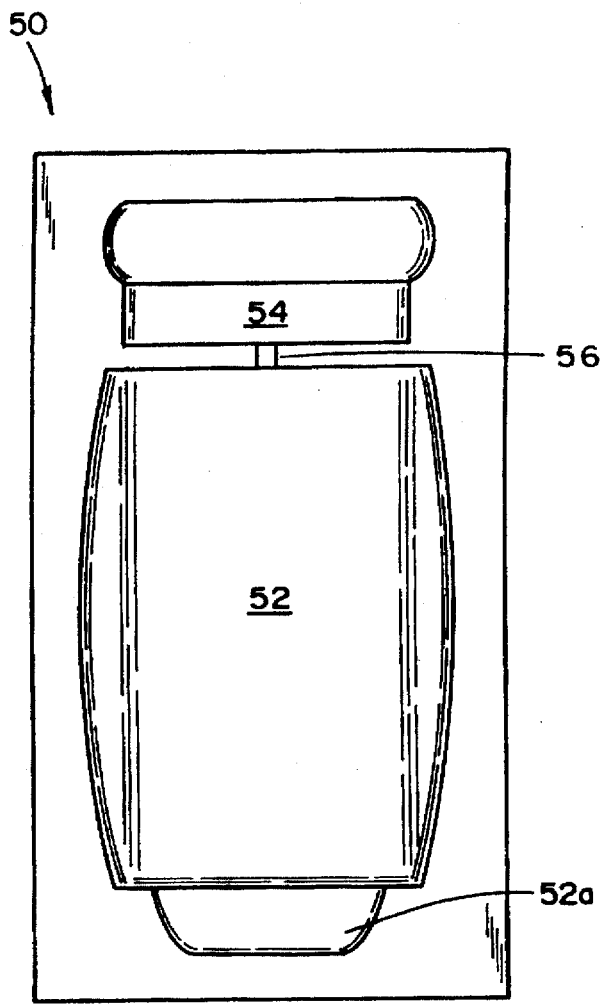
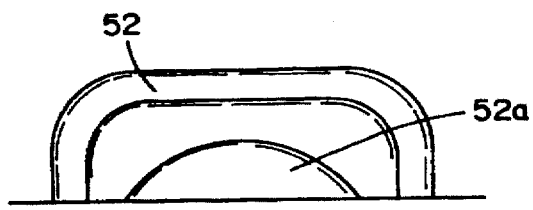

COFFEE PACKAGE WITH ENHANCED AROMA IMPACT

BACKGROUND OF THE INVENTION

This invention generally relates to coffee packs or packets, and more specifically, to a coffee pack that contains both a coffee product and a coffee aroma liquid.

Ground coffee products have substantial naturally occurring aroma that produces a significant aroma impact when a package or container of the coffee product is initially opened. This significant aroma impact may be missing when a package or container of instant coffee product is opened because instant coffee products do not have the same naturally occurring aroma as ground coffee products. In order to yield this aroma impact when a package of instant coffee product is opened, that coffee product may be enriched by the addition of an aromatized oil such as coffee aroma oil prior to or concurrent with packaging.

However, the aroma oil may deleteriously affect the appearance of the coffee product when made up in a cup. In larger packages of instant coffee, the aroma oil can be distributed evenly through the coffee so that any one cup does not contain enough aroma oil to deleteriously affect the appearance.

With a smaller coffee package such as a package having one or a few servings of coffee, it may be necessary to add the aroma oil to one place in the package. In addition, a small package may need more aroma oil per gram of coffee to deliver the desired aroma impact. Either of these could lead to a deleterious effect on the appearance of the coffee when made up in a cup.

SUMMARY OF THE INVENTION

An object of this invention is to improve packages for particulate soluble coffee products.

Another object of the present invention is to provide a packet having enough soluble coffee product for one or a few servings, and that successfully delivers a noticeable coffee aroma when opened while also maintaining the quality of the coffee product itself.

A further object of this invention is to enhance the aroma of a soluble coffee product by packaging a coffee aroma liquid with that coffee product while maintaining the coffee product and the aroma liquid at least substantially separated in the package.

These and other objectives are obtained with a coffee pack comprising a shell that forms separate coffee and aroma compartments with a small communicating hole or channel between the compartments. A quantity of particulate soluble or roast and ground coffee product is located in the coffee compartment, and a quantity of a coffee aroma liquid containing aromatic volatiles is disposed in the aroma compartment. The communicating hole or channel between the compartments allows the aromatic volatiles to pass from the aroma compartment to the coffee compartment, without allowing any mixing, or at least any substantial mixing, in the coffee compartment between the coffee product and the coffee aroma liquid.

After the coffee pack is made, the aromatic volatiles from the aroma liquid migrate from the aroma compartment and throughout the coffee product in the coffee compartment; however, the coffee product and the aroma liquids themselves are kept at least substantially separated. Then, when the coffee compartment is opened to provide access to the coffee product, the aromatic volatiles are released from the coffee compartment and produce the aroma impact normally associated with ground coffee products. At the same time, because the aroma liquid is not significantly mixed with the coffee product, that liquid has no affect, or no more than an insignificant affect, on the appearance of the coffee made from the coffee particulates.

To assemble the pack, a plastic mold is shaped in two compartments with a small communicating hole between the compartments. Coffee, preferably soluble coffee is filled into one of the two compartments; and an aromatized coffee liquid, or other essence, is accurately dosed into the other compartment, either with or without an absorbent pad to absorb the liquid. After adding the aroma liquid, the back of the mold is sealed by a flat sheet, such as a laminate including aluminum foil and polyethylene. After sealing, gaseous aroma equilibrates with the soluble coffee in the other compartment through the communicating hole.

The pack is opened for example, by cutting across the compartment containing the soluble coffee, at a point away from the compartment containing the aroma liquid. Aroma laden gas is released, becoming noticeable to the person opening the pack. The pack may contain a positive pressure to increase the amount of gas released and hence the aroma impact. The pack is especially well suited as a sample pack holding a comparatively small amount of coffee product, such as 2–10 grams, which is normally sufficient for one to four servings or alternately the pack could contain larger quantities of coffee.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIGS. 5A–5D are plan, bottom, top and side views, respectively, of an alternate design of the coffee packet.

DETAILED DESCRIPTION OF THE PREFERRED EMBODIMENTS

Figure 1:
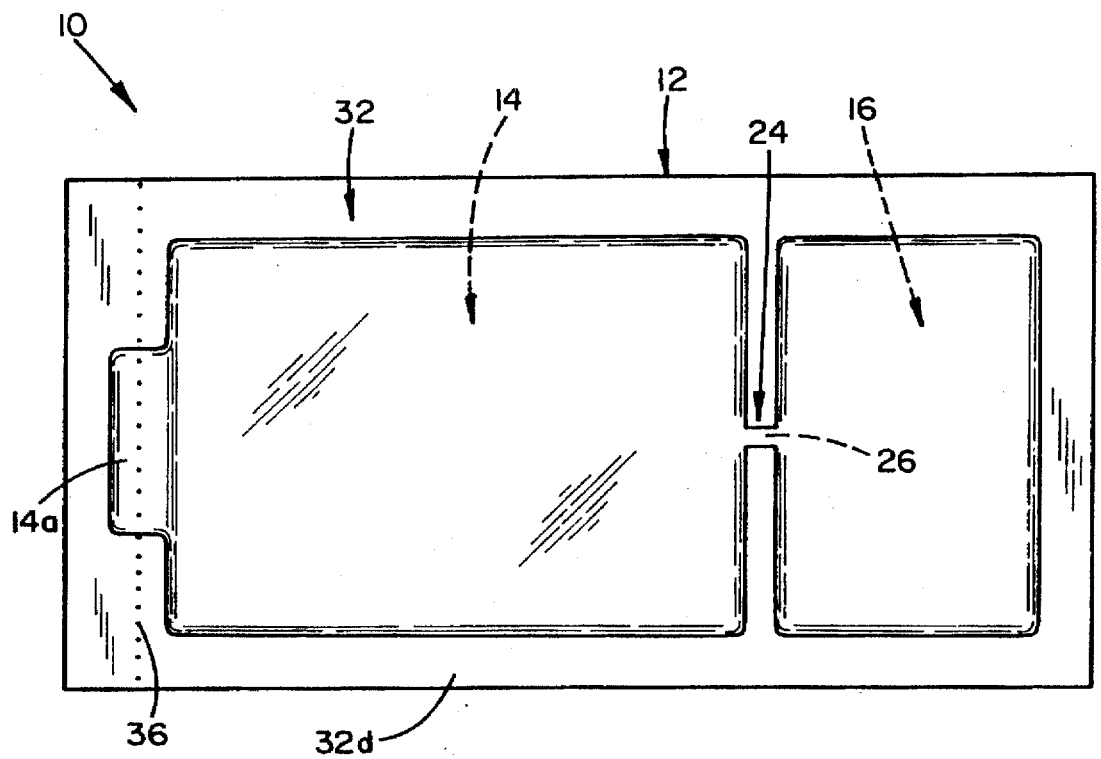
FIG. 1 is a plan view of a coffee packet embodying the present invention.
Figure 2:
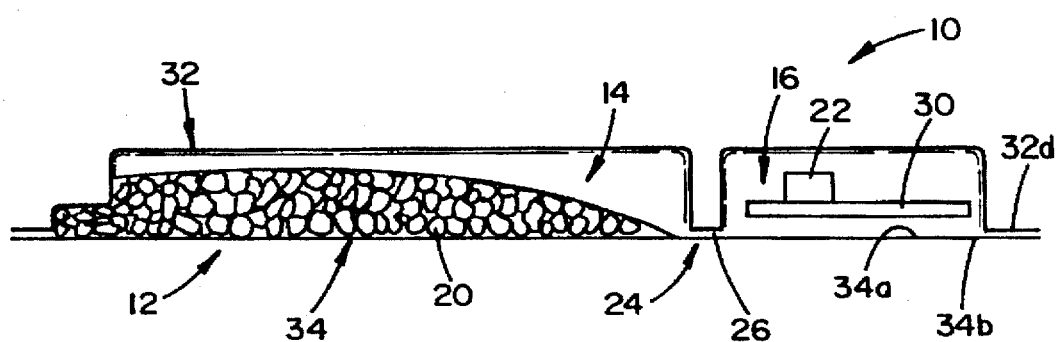
FIG. 2 is a side view of the coffee packet of FIG. 1.
Figure 3:
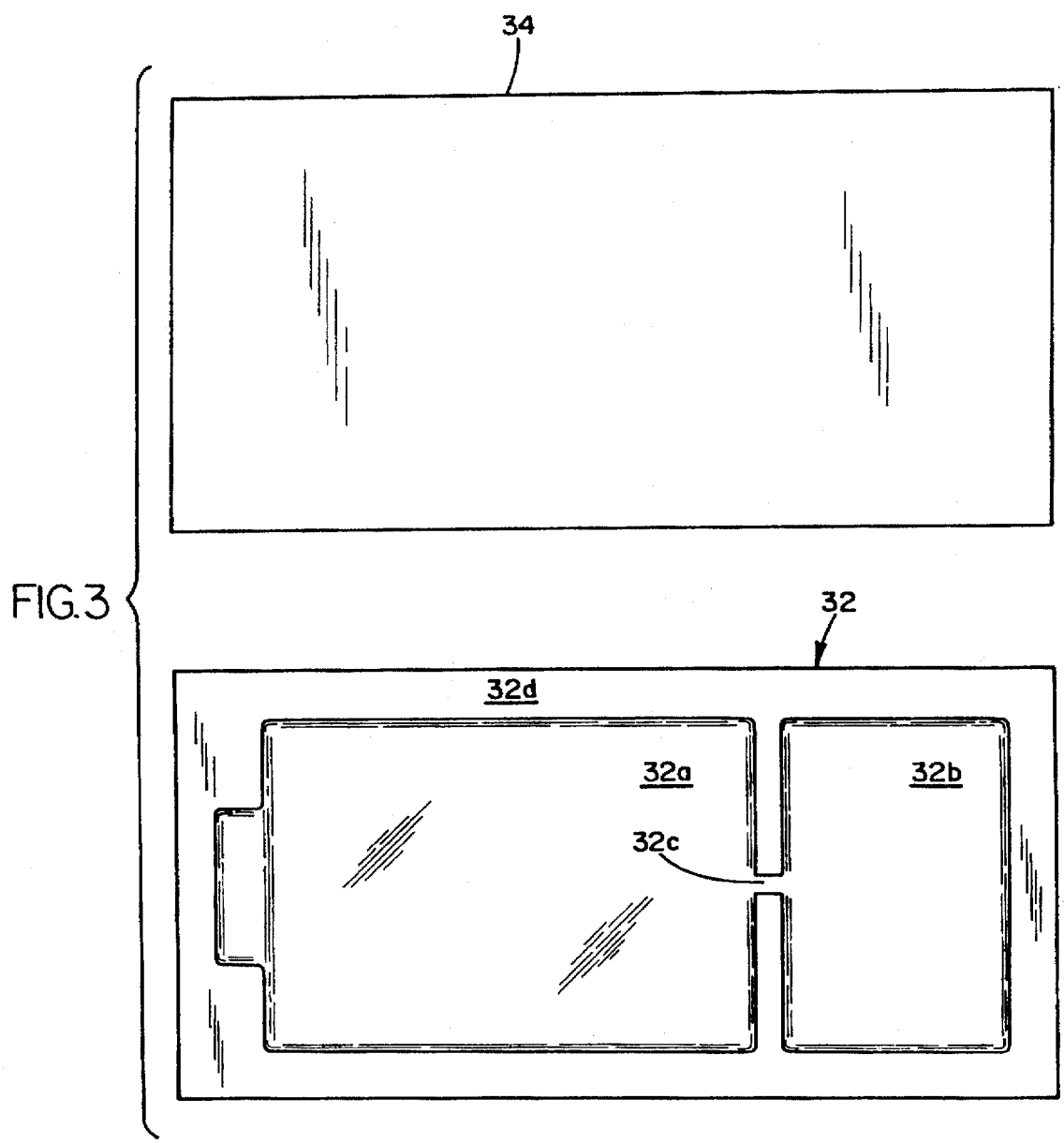
FIG. 3 shows sections of a shell of the coffee packet.

FIGS. 1–3 illustrate coffee packet 10 comprising shell or body 12 that forms coffee compartment 14 and aroma compartment 16. A quantity of particulate soluble coffee product 20 is disposed in compartment 14, and a quantity of aroma liquid preferably aroma oil 22 is contained in compartment 16. Shell 12 also includes channel section 24 that forms channel 26. With the embodiment of packet 10 illustrated in FIGS. 1–3, the aroma oil 22 is absorbed in absorbent pad 30 located in aroma compartment 16, and coffee compartment 14 includes spout portion 14a. In addition, shell or package 12 is comprised of first section or container 32 and second section or lid 34; and shell section 32, in turn, includes recesses or pockets 32a and 32b, groove 32c and flange portion 32d. Also, shell 12 may include means such as a tear line 36 to facilitate opening coffee compartment 14, specifically spout portion 14a thereof.

Coffee compartment 14 and aroma compartment 16 are spaced apart from each other in shell 12, and channel 26 extends between and is in communication with compartments 14 and 16. Channel 26 is sized and functions so that the aromatic volatiles from aroma oil 22 pass from aroma compartment 16, through channel 26 and into coffee compartment 14, while the aroma oil 22 itself is inhibited from passing through channel 26 and into the coffee compartment and the coffee is inhibited from passing from the coffee compartment 14 into aroma compartment 16.

With the above-described construction of coffee packet 10, after the packet is made, the aromatic volatiles from the aroma oil migrate from the compartment 16 and throughout the coffee product 20 in compartment 14; however, the coffee product 20 and the aroma oil 22 themselves are kept at least substantially separated. Then, when coffee compartment 14 is opened to provide access to the coffee product 20, the aromatic volatiles are released from the coffee compartment and produce the aroma impact normally associated with ground coffee products. At the same time, because the aroma oil 22 is not significantly mixed with the coffee product 20, that oil has no affect, or no more than an insignificant affect, on the appearance of the coffee made from the coffee particulates.

It should be noted that it is not necessary that channel 26, or channel section 24, completely prevent the aroma oil 22 from entering coffee compartment 14. It has been found that if a small quantity of the aroma oil enters the coffee compartment 14 via channel 26, that oil mixes with the coffee product, producing a plug in or adjacent the end of the channel 26, and this plug can sufficiently prevent or inhibit any additional aroma oil from mixing with the coffee product. In addition, preferably channel section 24 inhibits movement of the coffee particulates into aroma compartment 16. This also helps to keep the coffee particulates and the aroma oil separated.

Channel 26 could also be constructed such that it incorporates a device such as a membrane in all or part of said channel which will function to prevent migration of coffee aroma oil out of the aroma compartment 16 while permitting aromas to migrate to the coffee compartment 14.

A variety of types of coffee products may be packaged in packet 10. For instance, coffee product 20 may be instant coffee or ground coffee. In addition, packet 10 may be designed to hold a quantity of the coffee product that varies over a wide range. Packet 10 is especially well suited, though, for holding a comparatively small amount of soluble coffee product such as 8–10 grams, which is normally sufficient for three or four servings.

Numerous types of coffee aroma liquids may be used in the practice of this invention. Coffee aroma liquid 22 for purposes of the present invention may be expelled coffee oil, which inherently contains beneficial coffee aromas or it may be coffee oil which has been supplemented with coffee aromas which have been recovered from any one of several points in coffee processing. Examples of coffee aromas include recovery of aromas evolved during the roasting of coffee, aromas evolved during the grinding of roasted whole coffee beans, aromas recovered during the steaming, infusion or water extraction of ground roasted coffee and/or aromas which are recovered during the concentration or evaporation of coffee extract during the preparation of soluble coffee. Preferably the coffee aroma liquid is coffee oil.

Also coffee aroma oil 22 may also be a vegetable oil which as been supplemented with coffee aromas recovered during coffee processing. Alternatively the aroma oil may be vegetable oil or coffee oil which has been supplemented with artificial or synthetic aromas which attempt to duplicate natural coffee aromas. Additionally, the vegetable oil, aromatized vegetable oil, coffee oil, or coffee oil enhanced with coffee aroma may include one or more non-coffee, natural or artificial aromas, which may include for example hazelnut, vanilla, mint, mocha, amaretto and the like.

The coffee aroma liquid could also constitute an aqueous liquid such as water or concentrated coffee extract combined with natural or artificial coffee aroma and/or non-coffee aromas similar to those described above.

The amount of the coffee aroma oil used in packet 10 may vary over a substantial range, the important consideration being that the aroma oil produces the desired aroma impact without degrading the coffee product, the coffee made from that product or the appearance of that coffee. For example, with a packet 10 containing about 8–10 grams of the coffee product, the recommended maximum aroma oil level is about 1%, by weight, of the coffee product. Preferably, with this amount of coffee product, the aroma oil level is between 0.13% and 1.0%, and more preferably between 0.27% and 0.89%, by weight, of the coffee product.

As mentioned above, aroma compartment 16 may be provided with absorbent pad 30 to absorb and hold the aroma oil 22. The use of this pad 30 is advantageous because the pad helps to prevent or to inhibit the egress of the aroma oil from the aroma compartment. Absorbent pad 30 may be made, for example, from conventional or standard coffee filters or coffee filter paper. Those of ordinary skill in the art will readily appreciate, however, that the absorbent pad 30 may be made from any other suitable material or materials.

Shell 12 and shell sections 30 and 32 may have any suitable shapes and sizes. With the embodiment of shell sections 32 and 34 illustrated in FIGS. 1 through 3, flange 32d has a flat, thin shape, defining a plane, and this flange extends around pockets 32a and 32b and groove 32c. Pockets 32a and 32a and groove 32c, in turn, extend downward from the plane defined by flange 32d. Shell section 34 also has a flat, thin shape and, as discussed in greater detail below, is comprised of a pair of laminated layers 34a and 34b. The shape of shell section 34 substantially matches the shape formed by the outside perimeter of flange 32d of shell section 32.

Shell sections 32 and 34 may be made in any acceptable way from any appropriate material or materials. For example, shell section 32 may have a laminated construction, comprised of an outside layer of APET, a middle layer of EVOH and an inside layer of polyethylene. Shell section 32 may be formed in a thermo-molding process, in which a flat sheet of the desired laminated material is heated and pressed in a mold to form that sheet into the desired shape.

As mentioned above, shell section 34 preferably has a laminated construction, including layers 34a and 34b. For example, layer 34a may be an aluminum film and layer 34b may be a polyethylene film. Layers 34a and 34b may be coextruded together, or these layers may be formed separately and then joined together.

Shell sections 32 and 34 are connected together to form shell 12, and this may be done in any suitable manner. For instance, section 34 may be placed over and against flange 32d of section 32, and section 34 and flange 32d may then be heat-sealed together over their contiguous or abutting areas. In this way, sections 32 and 34 form compartments 14 and 16, channel 26, and an air and water tight seal extending around those compartments and channel.

Figure 4A:
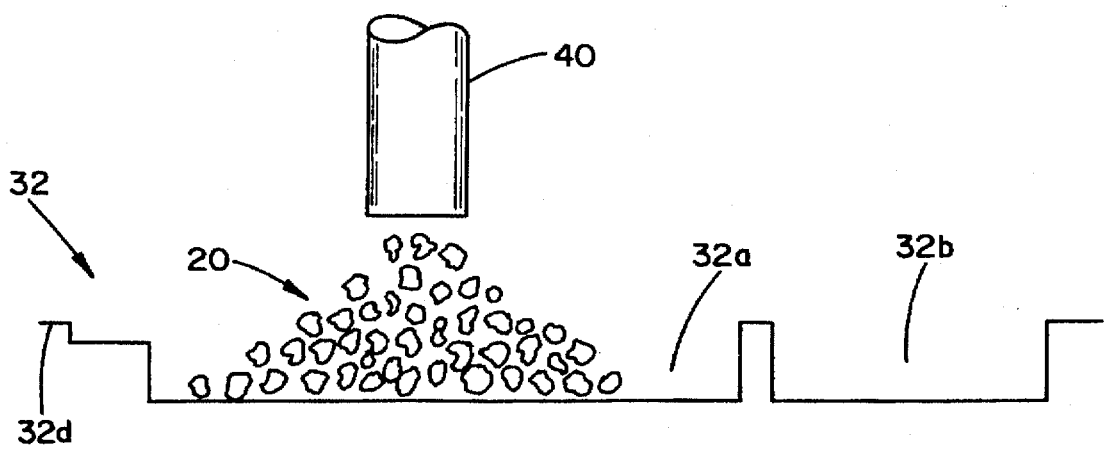
FIGS. 4A–4C schematically depict a procedure for assembling the coffee packet.
Figure 4B:
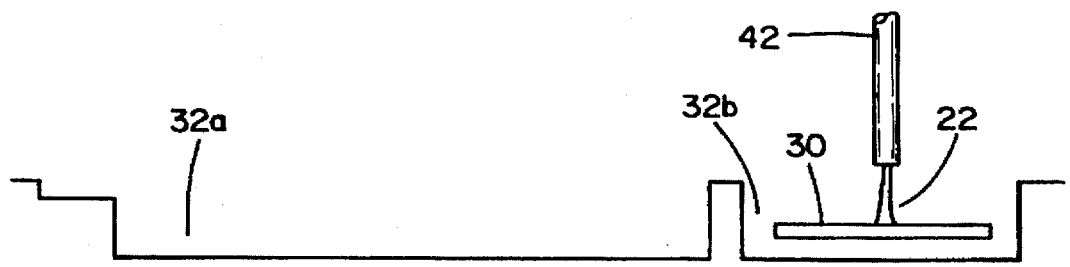
Figure 4C:
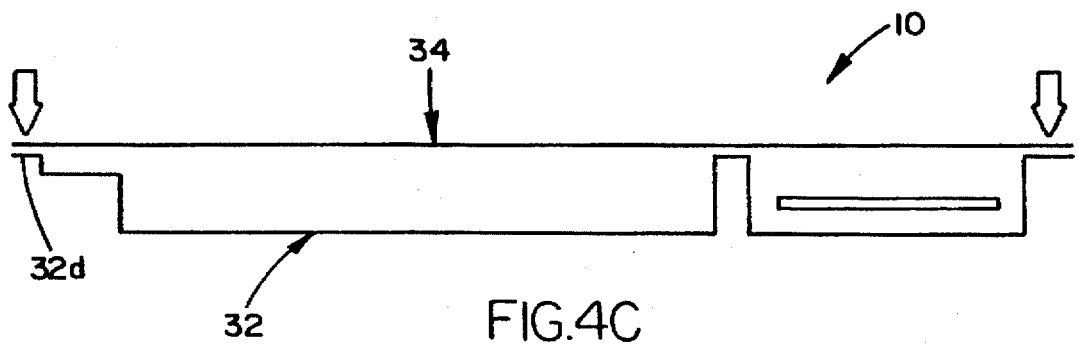

Any acceptable procedure may be used to assemble packet 10. For example, with reference to FIGS. 4A through 4C, the soluble coffee product 20 is filled into the coffee compartment 14 via coffee dispensing mechanism 40; and the aromatized oil is accurately dosed into the aroma compartment 16, via oil dispensing mechanism 42 and either with or without an absorbent pad 30. After the coffee and aroma compartments are filled, the back of the mold section 32 is sealed by the foil laminate 34; and, for example, foil laminate 34 may be heat-sealed to flange 32d of section 32. After sealing, the gaseous aroma equilibriates with the soluble coffee through the communicating hole 26.

Typically, it is desirable to maintain low oxygen levels inside packet 10, and to do this, the production area between the coffee filling and the mold sealing operations may be purged with a gas, such as nitrogen or carbon dioxide, that does not react with the coffee particulates 22. Additionally the soluble coffee product may have been purged of oxygen prior to being fed to the dispensing mechanism.

To enhance the aroma impact on opening packet 10, the packet can be pressurized—that is, the pressure inside the packet can be made greater than the ambient pressure. Any appropriate procedure may be used to develop that greater pressure inside packet 10. For instance, this can be done by cooling the coffee particulates 20 to a temperature between approximately −5° C. and −20° C. when the packet 10 is sealed. With this procedure, after the packet is sealed, the coffee particulates warm to ambient temperature, and as they warm, they also increase the pressure in the packet. Alternately, as another example, packet 10 may be assembled in a closed production area or environment or sealing apparatus having a pressure greater than ambient pressure.

As described above, packet 10 may be provided with means to facilitate opening the packet. A large number of specific features may be used for this purpose. For example, packet 10 may be provided with a score line or a tear line to help a user tear the packet open. In addition, the packet may simply be provided with a small notch or cut to help the user start a tear in the packet. As still another example, packet 10 may be provided with an opening or slit in communication with the interior of coffee compartment 14 and that is normally closed or covered by a peelable strip or cover adhesively attached to shell 12. With this latter arrangement, to open packet 10, a user simply removes that peelable strip.

It is not necessary, however, to the practice of the present invention that packet 10 be provided with any specific means or features to help a user open the packet. In such a case, the user may open the packet by tearing or cutting the packet, for example, across spout 14a.

Also as previously discussed, packet 10 may be made in a variety of shapes and sizes. For instance, the packet may be designed to resemble a larger jar or container of coffee made by the manufacturer of the packet, and FIGS. 5A–5D show such a packet, generally referenced at 50. With packet 50, the coffee compartment and the aroma compartment are referenced at 52 and 54 respectively, the communicating channel between these compartments is referenced at 56, and the spout of the coffee compartment is referenced at 52a. Further, with packet 50, aroma compartment 54 is designed to resemble the top or lid of a jar.

As will be understood by those of ordinary skill in the art, packets 10 and 50 may be provided with printing, labels and various other design features. For example, aroma compartments 16 and 54 may be colored, covered with a label or otherwise made opaque to screen the aroma liquid and absorbent pad 30 from view to improve the aesthetic appearance of the packet.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

I claim:

1. A coffee package with enhanced aroma impact comprising:

a compartmented container comprising first and second compartments and a flange portion around the perimeter of the container defining a plane, a quantity of particulate coffee contained in said first compartment, a quantity of coffee aroma liquid containing aromatic volatiles contained in said second compartment, and a lid sealed to the flange of the container to cover the first and second compartments with said particulate coffee and said coffee aroma liquid contained respectively therein, said container in combination with said lid providing a small channel between said first and second compartments which allows gaseous communication therebetween such that said aromatic volatiles emitted from said coffee aroma liquid pass from the second compartment to said first compartment and such that said particulate coffee and said aroma liquid are inhibited from passing between the first and second compartments so as to at least substantially prevent any mixing between said particulate coffee and the coffee aroma liquid.

2. A coffee package according to claim 1, further comprising an absorbent material in said first compartment, and wherein the aroma liquid is absorbed in the absorbent material.

3. A coffee package according to claim 1, wherein the quantity of aroma liquid is less than approximately 1%, by weight, of the particulate coffee.

4. A coffee package according to claim 3, wherein the quantity of aroma liquid is between 0.13% and 1.0%, by weight, of the quantity of particulate coffee.

5. A coffee package according to claim 1, wherein the pressure in the first and second compartments is above ambient pressure.

6. A coffee package according to claim 1, wherein the first compartment includes a portion forming a spout.

7. A coffee package according to claim 6, wherein the package includes means to facilitate tearing the package across the spout to open said spout to discharge the particulate coffee from the first compartment.

8. A coffee package according to claim 1, wherein the channel incorporates a membrane which will function to prevent migration of coffee aroma liquid out of the second compartment while permitting aromas to migrate to the first compartment.

\* \* \* \* \*